US008630158B2

(12) United States Patent
Liu et al.

(10) Patent No.: US 8,630,158 B2
(45) Date of Patent: Jan. 14, 2014

(54) METHOD FOR REDUCING A NUMBER OF INPUT TERMINALS OF AN AUTOMATIC POWER CONTROL CIRCUIT, AND ASSOCIATED AUTOMATIC POWER CONTROL CIRCUIT

(75) Inventors: Cong Liu, Anhui (CN); Chih-Chien Huang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 751 days.

(21) Appl. No.: 12/918,321

(22) PCT Filed: Jun. 13, 2010

(86) PCT No.: PCT/CN2010/073939
§ 371 (c)(1),
(2), (4) Date: Aug. 19, 2010

(87) PCT Pub. No.: WO2011/156951
PCT Pub. Date: Dec. 22, 2011

(65) Prior Publication Data
US 2011/0307909 A1 Dec. 15, 2011

(51) Int. Cl.
*G11B 7/00* (2006.01)
(52) U.S. Cl.
USPC ........................................ 369/116; 372/38.02
(58) Field of Classification Search
None
See application file for complete search history.

(56) References Cited

U.S. PATENT DOCUMENTS

| | | | | |
|---|---|---|---|---|
| 5,965,868 | A * | 10/1999 | Nakamori | 250/205 |
| 6,445,670 | B1 * | 9/2002 | Oshima | 369/116 |
| 6,560,256 | B1 * | 5/2003 | Seki et al. | 372/38.02 |
| 2001/0020670 | A1 | 9/2001 | Hyoga | |
| 2002/0014849 | A1 * | 2/2002 | Tsujikawa et al. | 315/169.1 |
| 2003/0002552 | A1 * | 1/2003 | Nagara | 372/38.02 |
| 2005/0083978 | A1 * | 4/2005 | Kim | 372/29.021 |

FOREIGN PATENT DOCUMENTS

| | | |
|---|---|---|
| CN | 1209760 C | 7/2005 |
| CN | 1292422 C | 12/2006 |

OTHER PUBLICATIONS

International application No. PCT/CN2010/073939, International filing date: Jun. 13, 2010, International Searching Report mailing date: Mar. 24, 2011.

* cited by examiner

*Primary Examiner* — Thang Tran
(74) *Attorney, Agent, or Firm* — Winston Hsu; Scott Margo (57) ABSTRACT

A method for reducing a number of input terminals of an APC circuit is provided, where the APC circuit is arranged to control an optical pickup unit (OPU) within an optical storage device. The method includes: utilizing at least one switching module to ground one of a first and a second input terminals of the APC circuit at a time; and utilizing the switching module to electrically connect an APC front end within the APC circuit to a non-grounded input terminal of the first and the second input terminals, in order to receive a detection signal of a photo diode of the OPU through the non-grounded input terminal at the time. An associated APC circuit is also provided.

19 Claims, 6 Drawing Sheets

METHOD FOR REDUCING A NUMBER OF INPUT TERMINALS OF AN AUTOMATIC POWER CONTROL CIRCUIT, AND ASSOCIATED AUTOMATIC POWER CONTROL CIRCUIT

BACKGROUND OF THE INVENTION

1. Field of the Invention

The present invention relates to control architecture of an optical pickup unit (OPU) within an optical storage device, and more particularly, to a method for reducing a number of input terminals of an automatic power control (APC) circuit, and to an associated APC circuit.

2. Description of the Related Art

According to the related art, a conventional optical storage device is equipped with an OPU for accessing data on an optical storage medium. For example, the optical storage medium can be an optical disc such as a Compact Disc (CD), a CD-Read Only Memory (CD-ROM), or a Digital Versatile Disc (DVD). In order to control the laser poser of at least one laser diode positioned in the OPU, a conventional APC circuit is required within the conventional optical storage device. In practice, the conventional APC circuit can be implemented as a chip, in order to reduce the overall size of the conventional optical storage device. As a result, the chip size of the conventional APC circuit may be an important issue. Typically, a manufacturer of the conventional optical storage device is willing to utilize chips of smaller sizes.

Please note that decreasing the chip size of the conventional APC circuit may be helpful on reducing the associated costs. However, in a situation where the chip size is decreased, the problem of insufficient space for the input/output (I/O) terminals of the conventional APC circuit may occur. Thus, regarding implementation of the control architecture of the OPU within the optical storage device, a novel method is required for reducing the total number of I/O terminals.

BRIEF SUMMARY OF THE INVENTION

It is therefore an objective of the claimed invention to provide a method for reducing a number of input terminals of an automatic power control (APC) circuit, and to provide an associated APC circuit, in order to solve the above-mentioned problem.

An exemplary embodiment of a method for reducing a number of input terminals of an APC circuit is provided, where the APC circuit is arranged to control an optical pickup unit (OPU) within an optical storage device. The method comprises: utilizing at least one switching module to ground one of a first and a second input terminals of the APC circuit at a time; and utilizing the switching module to electrically connect an APC front end within the APC circuit to a non-grounded input terminal of the first and the second input terminals, in order to receive a detection signal of a photo diode of the OPU through the non-grounded input terminal at the time.

An exemplary embodiment of an APC circuit is provided, where the APC circuit is arranged to control an OPU within an optical storage device. The APC circuit comprises a processing circuit, an APC front end, and at least one switching module. The processing circuit is arranged to perform APC operations, and the APC front end is arranged to perform front end processing for the processing circuit. In addition, the aforementioned at least one switching module is arranged to ground one of a first and a second input terminals of the APC circuit at a time, wherein the switching module is further arranged to electrically connect the APC front end to a non-grounded input terminal of the first and the second input terminals, in order to receive a detection signal of a photo diode of the OPU through the non-grounded input terminal at the time. In particular, the APC front end performs front end processing on the detection signal.

An exemplary embodiment of an APC circuit is provided, where the APC circuit is arranged to control an OPU within an optical storage device. The APC circuit comprises a processing circuit, an APC front end, and at least one switching module. The processing circuit is arranged to perform APC operations, and the APC front end is arranged to perform front end processing for the processing circuit. In addition, the APC front end is electrically connected to an input terminal of the APC circuit, in order to receive a detection signal of a photo diode of the OPU through the input terminal, and the APC front end performs front end processing on the detection signal. Additionally, the aforementioned at least one switching module is arranged to ground one of a first and a second resistor paths of the APC circuit at a time, wherein the first and the second resistor paths are electrically connected to the input terminal.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
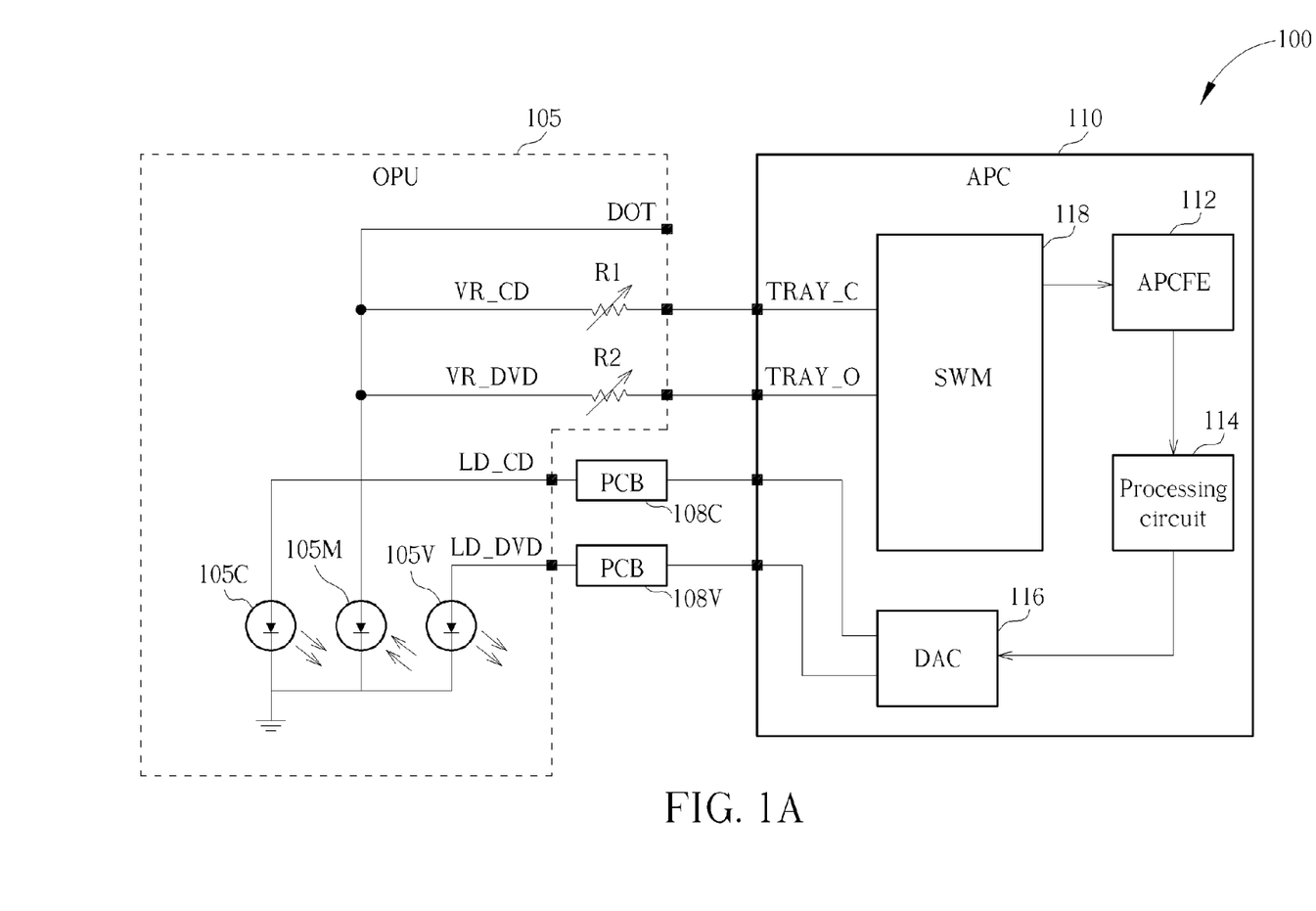
FIG. 1A is a diagram of an automatic power control (APC) circuit and an optical pickup unit (OPU) within an optical storage device according to a first embodiment of the present invention.

Please refer to FIG. 1A, which illustrates a diagram of an automatic power control (APC) circuit 110 (labeled "APC" in FIG. 1A) and an optical pickup unit (OPU) 105 within an optical storage device 100 according to a first embodiment of the present invention, where the APC circuit 110 is arranged to control the OPU 105. In addition to the APC circuit 110 and the OPU 105, the optical storage device 100 further comprises at least one printed circuit board (PCB) such as two PCBs 108C and 108V. In this embodiment, the APC circuit 110 comprises an APC front end 112 (labeled "APCFE" in FIG. 1A), a processing circuit 114, a digital-to-analog converter (DAC) 116, and at least one switching module such as a switching module 118 (labeled "SWM" in FIG. 1A). In addition, the OPU 105 comprises two laser diodes 105C and 105V, a photo diode 105M, and two variable resistors R1 and R2, where the variable resistors R1 and R2 are on resistor paths VR_CD and VR_DVD of the OPU 105, respectively. Additionally, the resistor paths VR_CD and VR_DVD respectively correspond to the laser diodes 105C and 105V.

According to this embodiment, the APC front end 112 is arranged to perform front end processing for the processing circuit 114, and the processing circuit 114 is arranged to perform APC operations and generate at least one processing result. As a result, the DAC 116 performs digital-to-analog conversion on the processing result and outputs associated digital values for controlling the laser diode 105C through the PCB 108C or controlling the laser diode 105V through the PCB 108V. Please note that the optical storage device 100 can drive the laser diode 105C on the driving path LD_CD by utilizing components on the PCB 108C or drive the laser diode 105V on the driving path LD_DVD by utilizing components on the PCB 108V, where the optical storage device 100 typically drives one of the laser diodes 105C and 105V at a time.

In practice, the aforementioned at least one switching module such as the switching module 118 is arranged to ground one of the input terminals TRAY_C and TRAY_O of the APC circuit 110 at a time, where the switching module 118 is further arranged to electrically connect the APC front end 112 to a non-grounded input terminal of the input terminals TRAY_C and TRAY_O, in order to receive a detection signal of the photo diode 105M (e.g. a node voltage level at the non-grounded end of the photo diode 105M) through the aforementioned non-grounded input terminal at the time. As a result, the APC front end 112 can perform front end processing on the detection signal mentioned above, and the processing circuit 114 can perform APC operations accordingly.

Figure 1B:
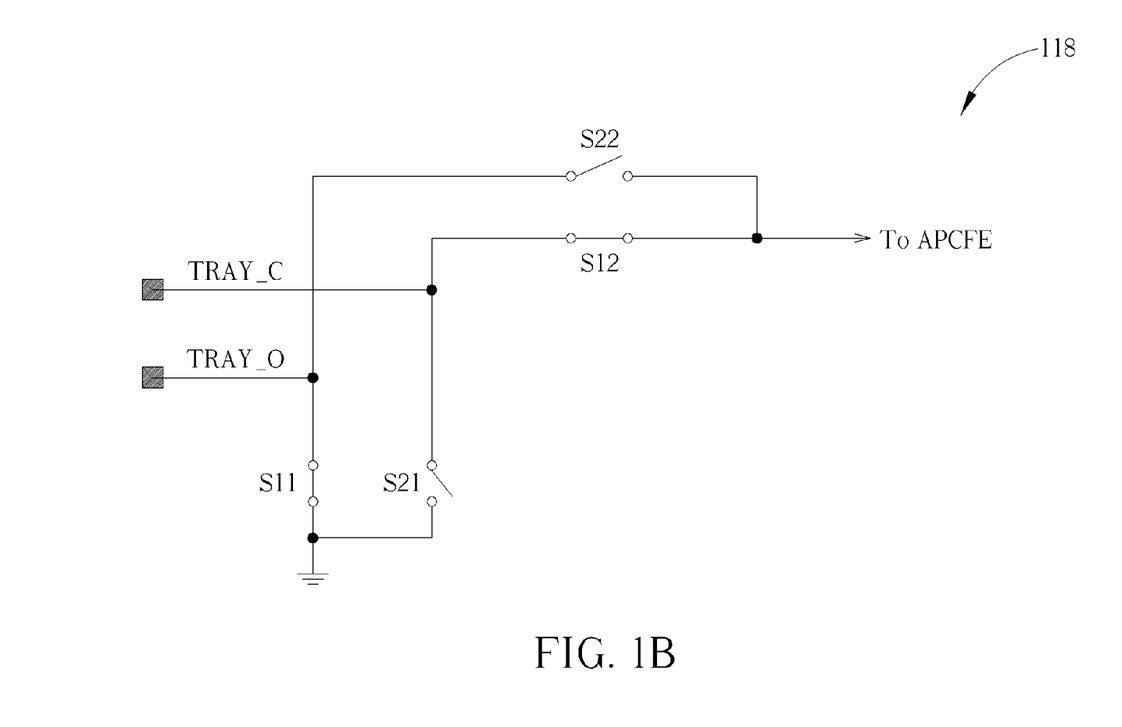
FIGS. 1B-1D illustrate implementation details of the switching module (SWM) shown in FIG. 1A according to respective embodiments of the present invention.
Figure 1C:
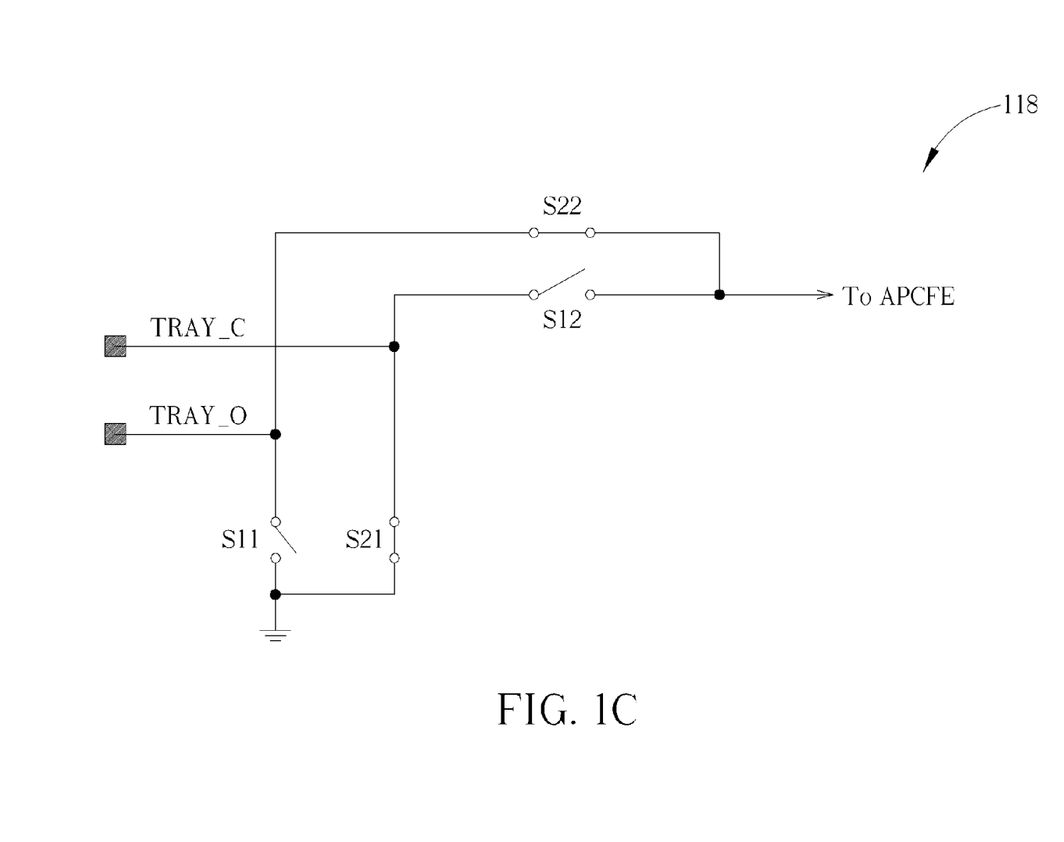
Figure 1D:
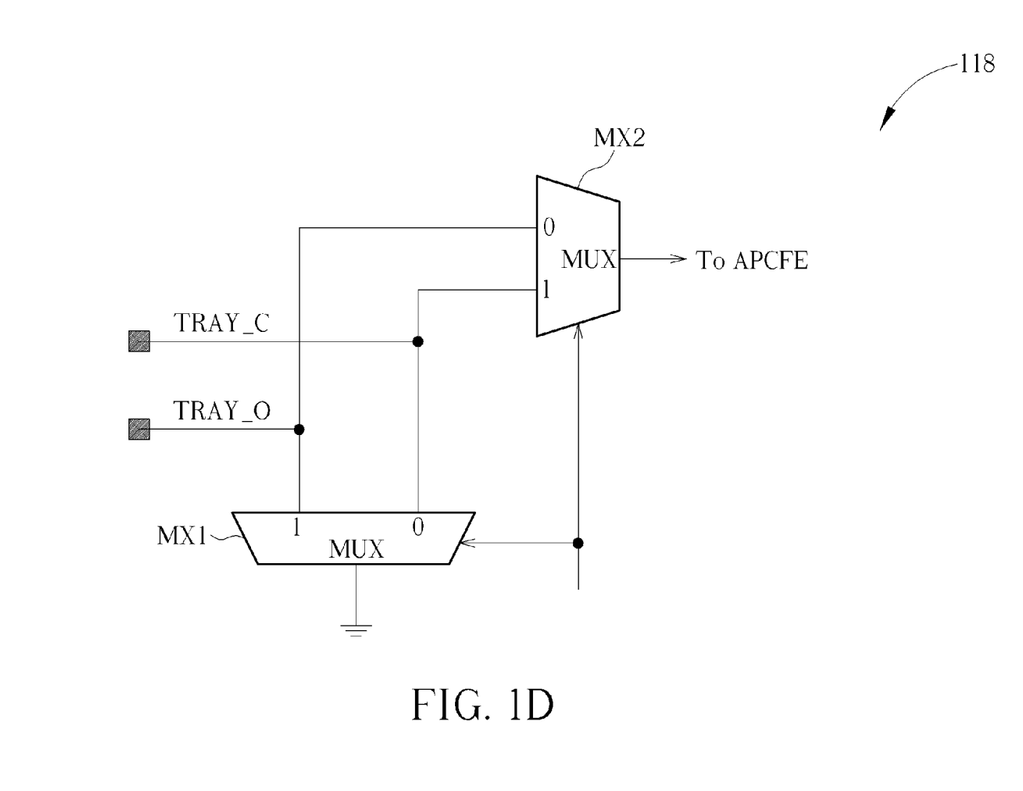

FIGS. 1B-1D illustrate implementation details of the switching module 118 shown in FIG. 1A according to respective embodiments of the present invention. In the embodiment shown in FIGS. 1B-1C, the switching module 118 comprises a plurality of switches such as the switches S11, S12, S21, and S22.

Referring to FIG. 1B, in a first switching mode of the switching module 118, a portion of the switches (e.g. the switches S11 and S12) is arranged to ground the input terminal TRAY_O and electrically connect the APC front end 112 to the input terminal TRAY_C. More particularly, in a situation where the optical storage device 100 is utilizing the laser diode 105V, rather than the laser diode 105C, the switch S11 grounds the input terminal TRAY_O, and the switch S12 electrically connects the APC front end 112 to the non-ground input terminal of this situation, i.e. the input terminal TRAY_C. In practice, the APC front end 112 can be equipped with high input impedance. More specifically, the APC front end 112 may comprise a Metal-Oxide-Semiconductor Field-Effect Transistor (MOSFET) whose gate can be utilized as the input of the APC front end 112. As a result, the current on the resistor path VR_CD is minor in this situation, and the voltage difference across the variable resistor R1 is minor. Therefore, the APC circuit 110 can utilize the voltage level received at the input terminal TRAY_C as the detection signal.

Referring to FIG. 1C, in a second switching mode of the switching module 118, another portion of the switches (e.g. the switches S21 and S22) is arranged to ground the input terminal TRAY_C and electrically connect the APC front end 112 to the input terminal TRAY_O. More particularly, in a situation where the optical storage device 100 is utilizing the laser diode 105C, rather than the laser diode 105V, the switch S21 grounds the input terminal TRAY_C, and the switch S22 electrically connects the APC front end 112 to the non-ground input terminal of this situation, i.e. the input terminal TRAY_O. In practice, the APC front end 112 can be equipped with the aforementioned high input impedance. As a result, the current on the resistor path VR_DVD is minor in this situation, and the voltage difference across the variable resistor R2 is minor. Therefore, the APC circuit 110 can utilize the voltage level received at the input terminal TRAY_O as the detection signal.

In this embodiment, the MOSFET mentioned above can be a p-type MOSFET (P-MOSFET). This is for illustrative purposes only, and is not meant to be a limitation of the present invention. According to a variation of this embodiment, the MOSFET mentioned above can be an n-type MOSFET (N-MOSFET).

Please note that the OPU 105 shown in FIG. 1A comprises a detection output terminal DOT for outputting the detection signal mentioned above. Based upon the architecture of this embodiment, no input terminal of the APC circuit 110 is wired to the detection output terminal DOT of the OPU 105 since the aforementioned non-grounded input terminal can be utilized for receiving the detection signal. Therefore, in contrast to the related art, the number of input terminals of the APC circuit 110 can be reduced.

In the embodiment shown in FIG. 1D, the switching module 118 comprises a multiplexer MX1 and a multiplexer MX2, where the multiplexers MX1 and MX2 can perform the same signal switching as that in the embodiment shown in FIGS. 1B-1C.

Referring to FIG. 1D, in the first switching mode of the switching module 118, the multiplexer MX1 is arranged to ground the input terminal TRAY_O and the multiplexer MX2 is arranged to electrically connect the APC front end 112 to the input terminal TRAY_C. In addition, in the second switching mode of the switching module 118, the multiplexer MX1 is arranged to ground the input terminal TRAY_C and the multiplexer MX2 is arranged to electrically connect the APC front end 112 to the input terminal TRAY_O.

In practice, the same selection signal can be utilized for controlling the multiplexers MX1 and MX2 at the same time, where the selection signal may correspond to a logical value "0" or a logical value "1". For example, the selection signal corresponds to the logical value "1" when the switching module 118 is in the first switching mode, or corresponds to the logical value "0" when the switching module 118 is in the second switching mode. This is for illustrative purposes only, and is not meant to be a limitation of the present invention. According to a variation of this embodiment, the selection signal corresponds to the logical value "0" when the switching module 118 is in the first switching mode, or corresponds to the logical value "1" when the switching module 118 is in the second switching mode. According to another variation of this embodiment, two selection signals can be respectively utilized for controlling the multiplexers MX1 and MX2.

Similarly, based upon the architecture of this embodiment, no input terminal of the APC circuit 110 is wired to the detection output terminal DOT of the OPU 105 since the aforementioned non-grounded input terminal can be utilized for receiving the detection signal. Therefore, in contrast to the related art, the number of input terminals of the APC circuit 110 can be reduced. Some implementation details are further described according to FIG. 2.

Figure 2:
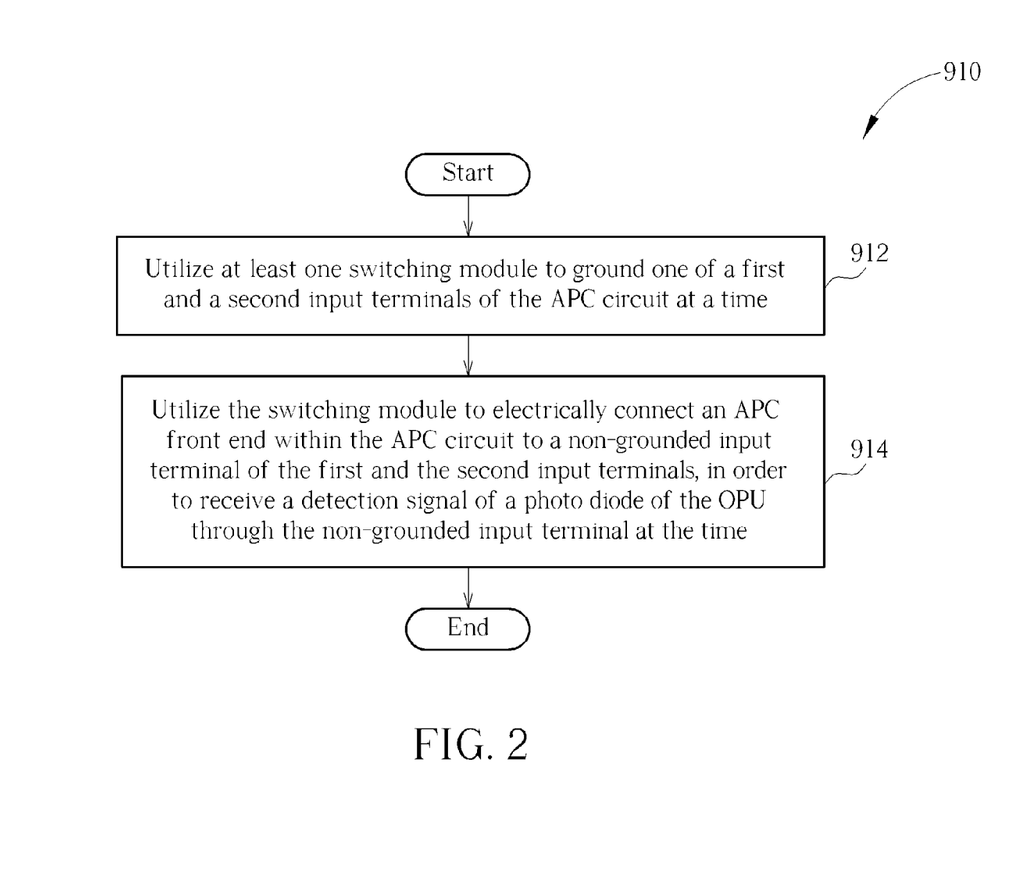
FIG. 2 is a flowchart of a method for reducing the number of input terminals of an APC circuit according to one embodiment of the present invention.

FIG. 2 is a flowchart of a method 910 for reducing the number of input terminals of an APC circuit according to one embodiment of the present invention. The method 910 shown in FIG. 2 can be applied to the APC circuit 110 shown in FIG. 1A. The method is described as follows.

In Step 912, the APC circuit 110 utilizes at least one switching module, such as the switching module 118 disclosed above, to ground one of a first and a second input terminals of the APC circuit 110 (e.g. one of the input terminals TRAY_C and TRAY_O) at a time.

In Step 914, the APC circuit 110 utilizes the switching module 118 to electrically connect an APC front end within the APC circuit 110, such as the APC front end 112 mentioned above, to a non-grounded input terminal of the first and the second input terminals (e.g. the non-grounded input terminal of the input terminals TRAY_C and TRAY_O), in order to receive a detection signal of a photo diode of the OPU 105, such as the aforementioned detection signal of the photo diode 105M, through the non-grounded input terminal at the time.

In this embodiment, the input terminal TRAY_C is utilized for electrically connecting the APC circuit 110 to the resistor path VR_CD, and the input terminals TRAY_O is utilized for electrically connecting the APC circuit 110 to the resistor path VR_DVD. More specifically, the input terminal TRAY_C is utilized for electrically connecting the APC circuit 110 to the variable resistor R1 on the resistor path VR_CD, and the input terminal TRAY_O is utilized for electrically connecting the APC circuit 110 to the variable resistor R2 on the resistor path VR_DVD.

In a situation where the APC circuit 110 is arranged to perform APC operations for a specific laser diode of the laser diodes 105C and 105V, the switching module 118 is arranged to ground the input terminal that is utilized for electrically connecting the APC circuit 110 to a specific resistor path of the resistor paths VR_CD and VR_DVD, where the specific resistor path corresponds to the specific laser diode. For example, in a situation where the APC circuit 110 is arranged to perform APC operations for the laser diode 105C, the switching module 118 is arranged to ground the input terminal TRAY_C that is utilized for electrically connecting the APC circuit 110 to the resistor path VR_CD. In another example, in a situation where the APC circuit 110 is arranged to perform APC operations for the laser diode 105V, the switching module 118 is arranged to ground the input terminal TRAY_O that is utilized for electrically connecting the APC circuit 110 to the resistor path VR_DVD.

Figure 3:
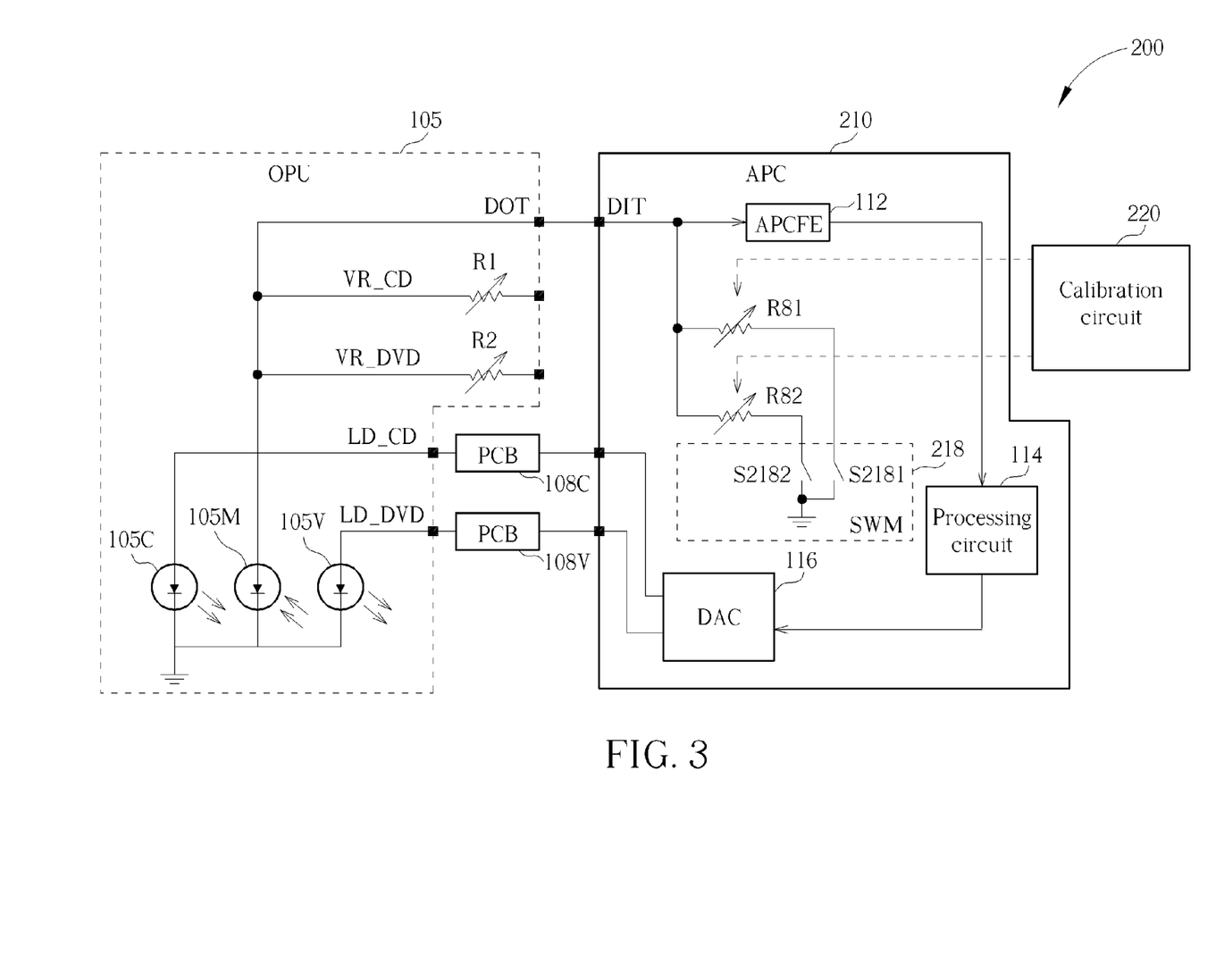
FIG. 3 is a diagram of an APC circuit and an OPU within an optical storage device according to a second embodiment of the present invention.

FIG. 3 is a diagram of an APC circuit 210 (labeled "APC" in FIG. 3) and an OPU such as the OPU 105 within an optical storage device 200 according to a second embodiment of the present invention. The differences between the first and the second embodiments are described as follows.

The APC circuit 210 comprises at least one switching module such as the switching module 218 (labeled "SWM" in FIG. 3), and further comprises two resistors such as two variable resistors R81 and R82, where the variable resistors R81 and R82 are on a first and a second resistor paths of the APC circuit 210, respectively. In this embodiment, the APC front end 112 is electrically connected to an input terminal DIT of the APC circuit 210, in order to receive the aforementioned detection signal of the photo diode 105M through the input terminal DIT. In addition, the aforementioned at least one switching module such as the switching module 218 is arranged to ground one of the first and the second resistor paths of the APC circuit 210 at a time, where the first and the second resistor paths are electrically connected to the input terminal DIT. In practice, the switching module 218 may comprise two switches S2181 and S2182. By controlling the switches S2181 and S2182, the switching module 218 is arranged to ground one of the variable resistors R81 and R82 at the time.

In this embodiment, the optical storage device 200 further comprises a calibration circuit 220 arranged to calibrate the variable resistors R81 and R82. For example, the calibration circuit 220 can be an external circuit of the APC circuit 210. This is for illustrative purposes only, and is not meant to be a limitation of the present invention. According to a variation of this embodiment, the calibration circuit 220 can be integrated into the APC circuit 210. According to another variation of this embodiment, the calibration circuit 220 can be positioned outside the optical storage device 200.

As shown in FIG. 3, the first and the second resistor paths of the APC circuit 210 (i.e. the resistor paths respectively having the variable resistors R81 and R82 thereon) respectively correspond to the associated resistor paths VR_CD and VR_DVD, and respectively correspond to the laser diodes 105C and 105V. More particularly, the first and the second resistor paths of the APC circuit 210 can be utilized for replacing the associated resistor paths VR_CD and VR_DVD, respectively. That is, the variable resistors R81 and R82 can be utilized for replacing the variable resistors R1 and R2, respectively. In a situation where the APC circuit 210 is arranged to perform APC operations for a specific laser diode of the laser diodes 105C and 105V, the switching module is arranged to ground a specific resistor path of the first and the second resistor paths of the APC circuit 210 (i.e. those respectively having the variable resistors R81 and R82 thereon) that corresponds to the specific laser diode.

Based upon the architecture of this embodiment, the first and the second resistor paths of the APC circuit 210 and the APC front end 112 share the input terminal DIT, and no input terminal of the APC circuit 210 is wired to any of the resistor paths VR_CD and VR_DVD of the OPU 105. Therefore, in contrast to the related art, the number of input terminals of the APC circuit 110 can be reduced.

It is an advantage of the present invention that, based upon the architecture of the embodiments/variations disclosed above, the goal of decreasing the chip size of the APC circuit can be achieved without being hindered by the related art problem such as the problem of insufficient space for the input/output (I/O) terminals. As a result, the associated costs and/or the overall size of the optical storage device can be reduced.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for selecting input terminals of an automatic power control (APC) circuit, the APC circuit being arranged to control an optical pickup unit (OPU) within an optical storage device, the method comprising:

grounding one of a first and a second input terminals of the APC circuit at a time by utilizing at least one switching module;

electrically connecting an APC front end within the APC circuit to a non-grounded input terminal of the first and the second input terminals by utilizing the switching module; and receiving a detection signal of a photo diode of the OPU through the non-grounded input terminal at the time.

2. The method of claim 1, wherein the first input terminal is utilized for electrically connecting the APC circuit to a first resistor path of the OPU, and the second input terminal is utilized for electrically connecting the APC circuit to a second resistor path of the OPU.

3. The method of claim 2, wherein the first input terminal is utilized for electrically connecting the APC circuit to a first variable resistor on the first resistor path, and the second input terminal is utilized for electrically connecting the APC circuit to a second variable resistor on the second resistor path.

4. The method of claim 2, wherein the OPU comprises a first and a second laser diodes, and the first and the second resistor paths respectively correspond to the first and the second laser diodes; and the step of grounding further comprises:

in a situation where the APC circuit is arranged to perform APC operations for a specific laser diode of the first and the second laser diodes, grounding the input terminal that is utilized for electrically connecting the APC circuit to a specific resistor path of the first and the second resistor paths, wherein the specific resistor path corresponds to the specific laser diode.

5. The method of claim 1, wherein the switching module comprises a plurality of switches; in a first switching mode of the switching module, a portion of the switches is arranged to ground the first input terminal and electrically connect the APC front end to the second input terminal; and in a second switching mode of the switching module, another portion of the switches is arranged to ground the second input terminal and electrically connect the APC front end to the first input terminal.

6. The method of claim 1, wherein the switching module comprises a first multiplexer and a second multiplexer; in a first switching mode of the switching module, the first multiplexer is arranged to ground the first input terminal and the second multiplexer is arranged to electrically connect the APC front end to the second input terminal; and in a second switching mode of the switching module, the first multiplexer is arranged to ground the second input terminal and the second multiplexer is arranged to electrically connect the APC front end to the first input terminal.

7. The method of claim 1, wherein the OPU comprises a detection output terminal for outputting the detection signal; and no input terminal of the APC circuit is wired to the detection output terminal.

8. An automatic power control (APC) circuit, the APC circuit being arranged to control an optical pickup unit (OPU) within an optical storage device, the APC circuit comprising:

a processing circuit arranged to perform APC operations;
an APC front end arranged to perform front end processing for the processing circuit; and
at least one switching module arranged to ground one of a first and a second input terminals of the APC circuit at a time, wherein the switching module is further arranged to electrically connect the APC front end to a non-grounded input terminal of the first and the second input terminals, in order to receive a detection signal of a photo diode of the OPU through the non-grounded input terminal at the time;
wherein the APC front end performs front end processing on the detection signal.

9. The APC circuit of claim 8, wherein the first input terminal is utilized for electrically connecting the APC circuit to a first resistor path of the OPU, and the second input terminal is utilized for electrically connecting the APC circuit to a second resistor path of the OPU.

10. The APC circuit of claim 9, wherein the first input terminal is utilized for electrically connecting the APC circuit to a first variable resistor on the first resistor path, and the second input terminal is utilized for electrically connecting the APC circuit to a second variable resistor on the second resistor path.

11. The APC circuit of claim 9, wherein the OPU comprises a first and a second laser diodes, and the first and the second resistor paths respectively correspond to the first and the second laser diodes; and in a situation where the APC circuit is arranged to perform APC operations for a specific laser diode of the first and the second laser diodes, the switching module is arranged to ground the input terminal that is utilized for electrically connecting the APC circuit to a specific resistor path of the first and the second resistor paths, wherein the specific resistor path corresponds to the specific laser diode.

12. The APC circuit of claim 8, wherein the switching module comprises a plurality of switches; in a first switching mode of the switching module, a portion of the switches is arranged to ground the first input terminal and electrically connect the APC front end to the second input terminal; and in a second switching mode of the switching module, another portion of the switches is arranged to ground the second input terminal and electrically connect the APC front end to the first input terminal.

13. The APC circuit of claim 8, wherein the switching module comprises a first multiplexer and a second multiplexer; in a first switching mode of the switching module, the first multiplexer is arranged to ground the first input terminal and the second multiplexer is arranged to electrically connect the APC front end to the second input terminal; and in a second switching mode of the switching module, the first multiplexer is arranged to ground the second input terminal and the second multiplexer is arranged to electrically connect the APC front end to the first input terminal.

14. The APC circuit of claim 8, wherein the OPU comprises a detection output terminal for outputting the detection signal; and no input terminal of the APC circuit is wired to the detection output terminal.

15. An automatic power control (APC) circuit, the APC circuit being arranged to control an optical pickup unit (OPU) within an optical storage device, the APC circuit comprising:

a processing circuit arranged to perform APC operations;
an APC front end arranged to perform front end processing for the processing circuit, wherein the APC front end is electrically connected to an input terminal of the APC circuit, in order to receive a detection signal of a photo diode of the OPU through the input terminal, and the APC front end performs front end processing on the detection signal; and
at least one switching module arranged to ground one of a first and a second resistor paths of the APC circuit at a time, wherein the first and the second resistor paths are electrically connected to the input terminal,
wherein the OPU comprises two resistor paths, and the first and the second resistor paths of the APC circuit respectively correspond to the two resistor paths of the OPU; and no input terminal of the APC circuit is wired to any of the two resistor paths of the OPU.

16. The APC circuit of claim 15, wherein the APC circuit comprises a first resistor and a second resistor; and the first and the second resistors are on the first and the second resistor paths, respectively.

17. The APC circuit of claim 16, wherein the first and the second resistors are variable resistors; and the variable resistors are calibrated by a calibration circuit.

18. The APC circuit of claim 17, wherein the calibration circuit is integrated into the APC circuit.

19. The APC circuit of claim 15, wherein the OPU comprises a first and a second laser diodes, and the first and the second resistor paths respectively correspond to the first and the second laser diodes; and in a situation where the APC circuit is arranged to perform APC operations for a specific laser diode of the first and the second laser diodes, the switching module is arranged to ground a specific resistor path of the first and the second resistor paths that corresponds to the specific laser diode.

* * * * *